G. W. McKINSTRY.
OPHTHALMIC MOUNTING.
APPLICATION FILED JULY 25, 1919.

1,317,206.

Patented Sept. 30, 1919.

Inventor.
George W. McKinstry
By Horatio E. Bellows
Attorney.

UNITED STATES PATENT OFFICE.

GEORGE W. McKINSTRY, OF SOUTHBRIDGE, MASSACHUSETTS, ASSIGNOR TO BAY STATE OPTICAL COMPANY, A CORPORATION OF MAINE.

OPHTHALMIC MOUNTING.

1,317,206.  Specification of Letters Patent.  Patented Sept. 30, 1919.

Application filed July 25, 1919. Serial No. 313,180.

*To all whom it may concern:*

Be it known that I, GEORGE W. McKINSTRY, a citizen of the United States, residing at Southbridge, in the county of Worcester and State of Massachusetts, have invented certain new and useful Improvements in Ophthalmic Mountings, of which the following is a specification.

My invention relates to eyeglass and spectacle mountings wherein the rims carry circular lenses.

Cylindrical lenses, which have axes, are deranged by any axial movement in the mounting; while in the case of spherical lenses, in which axes are absent, rotation is immaterial. The essential objects of my invention are to provided a mounting adapted for use with both types of lenses without any change of construction in the mounting; to prevent any piercing or severance of the rims to accommodate the locking means; to minimize the number of parts; and to attain the ends in an inexpensive structure of maximum strength and simplicity.

My invention consists in the construction, combination, and mode of operation of parts set forth in and falling within the scope of the claims hereto appended.

Figure 1:
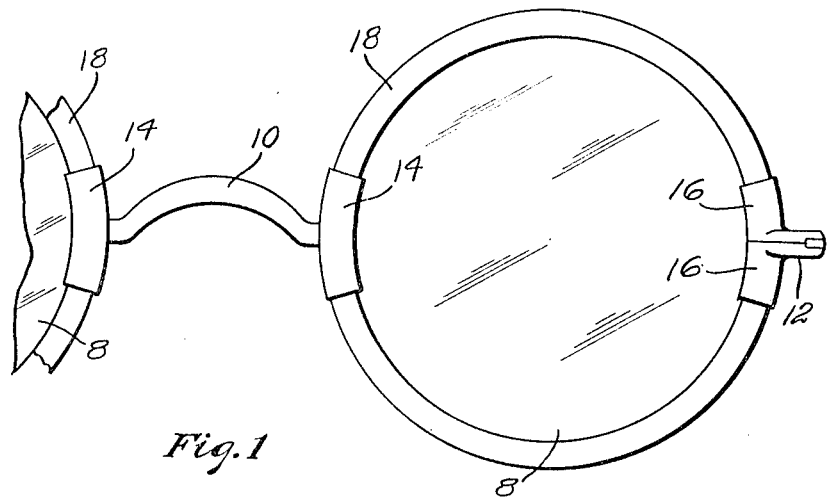
Figures 2, 3, 4:
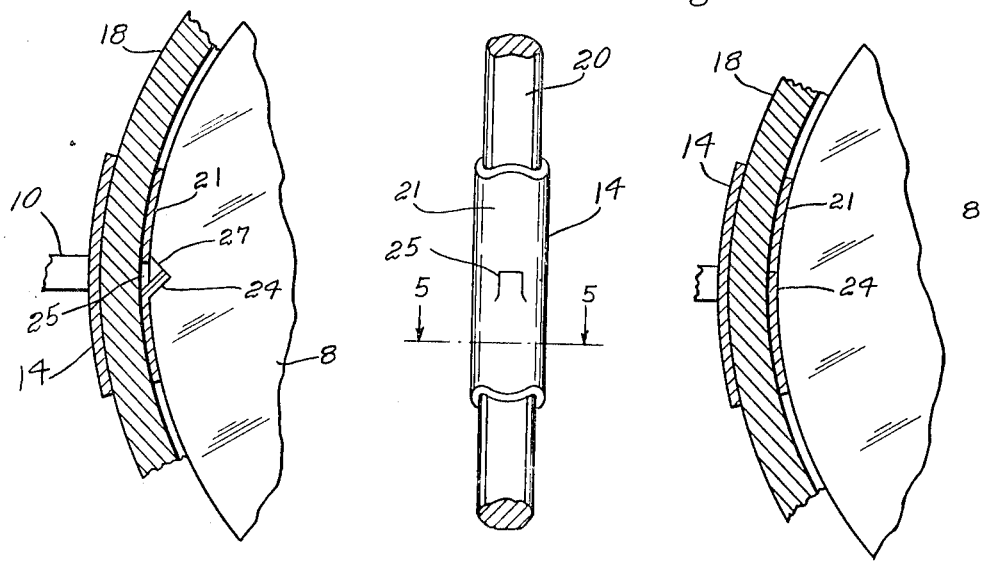
Figure 5:
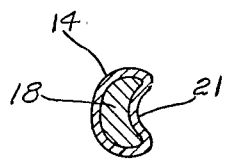

In the accompanying drawings illustrating the principle of this invention and forming a part of this specification, Figure 1 is a front elevation of a pair of spectacles or eyeglasses embodying my invention, Fig. 2, an enlarged longitudinal section of a portion of the structure adjacent one end of the bridge, Fig. 3, a section of the same on line 3—3 of Fig. 1, the lens being removed, Fig. 4, a section corresponding to that of Fig. 2 showing the parts in another position, and Fig. 5, a section on line 5—5 of Fig. 3.

Similar numerals of reference indicate similar parts throughout the views.

In the form of my invention herein shown 8 are the circular lenses, 10 the bridge, and 12 the end pieces of the frame. Fast to the ends of the bridge are metallic sleeves 14, and integral with the end pieces are sleeves 16. The sleeves constitute mountings for rims 18 which are preferably of zylonite or other such material and have internal annular grooves 20. The sleeves tightly embrace the rims and have longitudinally disposed concave portions or inwardly directed shoulders 21 seated in the grooves. One of the sleeves, in this case sleeve 14, has the material of its wall or shoulder cut to form a longitudinally disposed rectangular tongue 24 normally bent outwardly at an inclination to the sleeve, but of such a yielding character that it is capable of being manually forced back into the square opening 25 so as to again lie in the plane of the sleeve wall.

The circular cylindrical lens 8 is shown to be provided in Fig. 2 with a transversely disposed V-shaped notch or cavity 27. The projecting tongue 24 registers in this cavity and prevents accidental rotation of the lens. In Fig. 4 the lens is of the circular spherical type so that no notch is required. In this case the tongue 24 is pressed back into its opening 25 and the periphery of the lens abuts against the face of the sleeve.

The locking means is without any change of construction capable of being used at option with either a cylindrical or spherical lens. The integral character of the tongue insures a maximum of strength, and durability and is inexpensive to form. This tongue enters the lens cavity directly without passing through any portion of the rim which prevents structural weakening and expense.

I claim,—

1. In eyeglasses or spectacles, circular lens rims, sleeves embracing the rims, and yielding tongues on the sleeves adapted to engage lenses.

2. In eyeglasses or spectacles, circular lens rims, sleeves embracing the rims and provided with longitudinally disposed openings, and yielding tongues integral with the sleeves in the openings adapted to engage lenses.

3. In eyeglasses or spectacles, circular non-metallic lens rims, metallic sleeves embracing the rims, and movable tongues integral with the sleeves and forming a constituent part thereof adapted to engage lenses.

4. In eyeglasses or spectacles, a bridge, metallic sleeves fast to the ends of the bridge comprising longitudinally disposed transversely concave portions, circular non-metallic rims embraced by the sleeves and provided with annular grooves, yielding tongues integral with the sleeves and normally disposed at an angle to the sleeves, and lenses seated in the grooves adapted to engage the tongues.

In testimony whereof I have affixed my signature.

GEORGE W. McKINSTRY.